J. K. OTT.
CHANGE SPEED GEAR.
APPLICATION FILED MAR. 6, 1918.
1,277,251.
Patented Aug. 27, 1918.
7 SHEETS—SHEET 3.
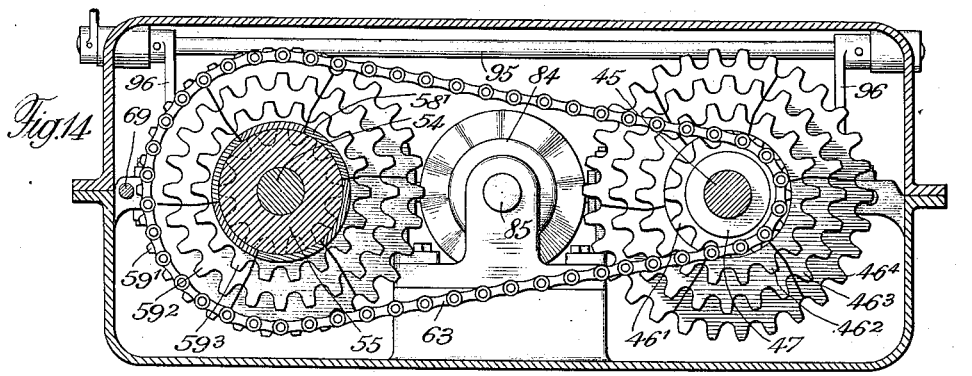
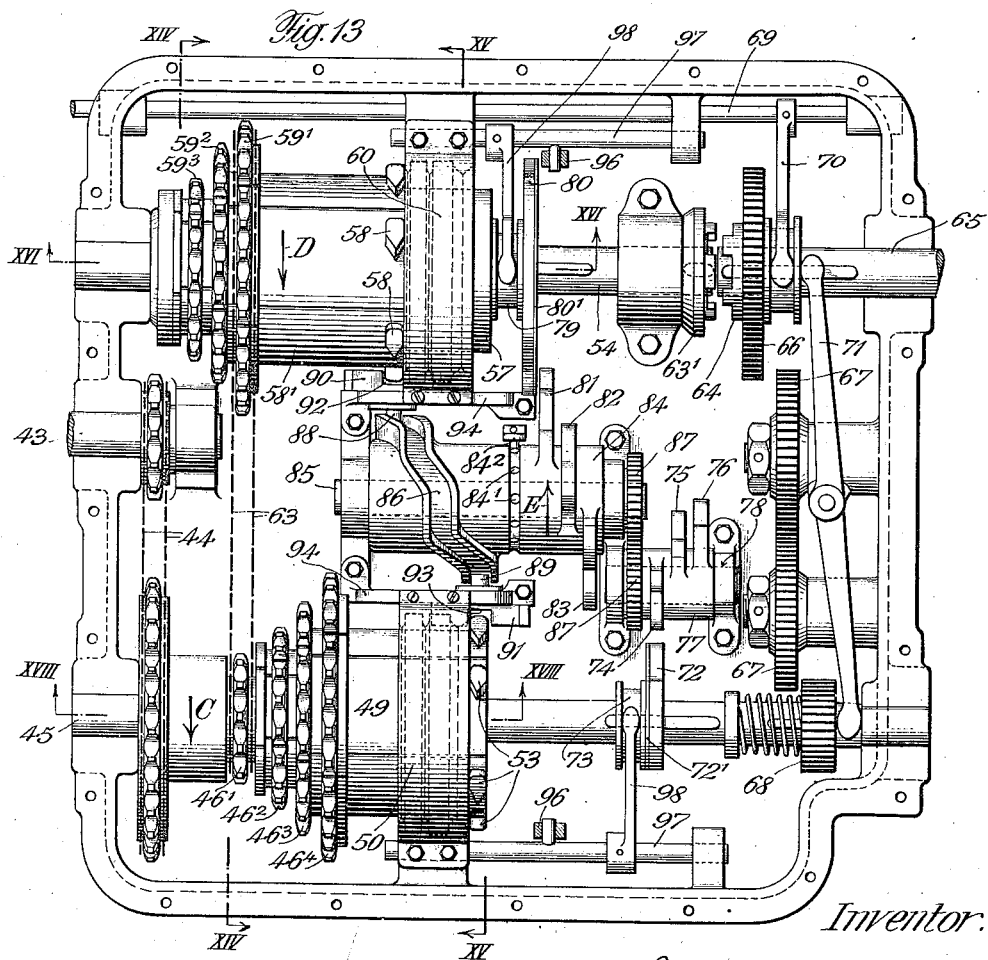
Inventor:
Johann Klaus Ott,
By
Atty.

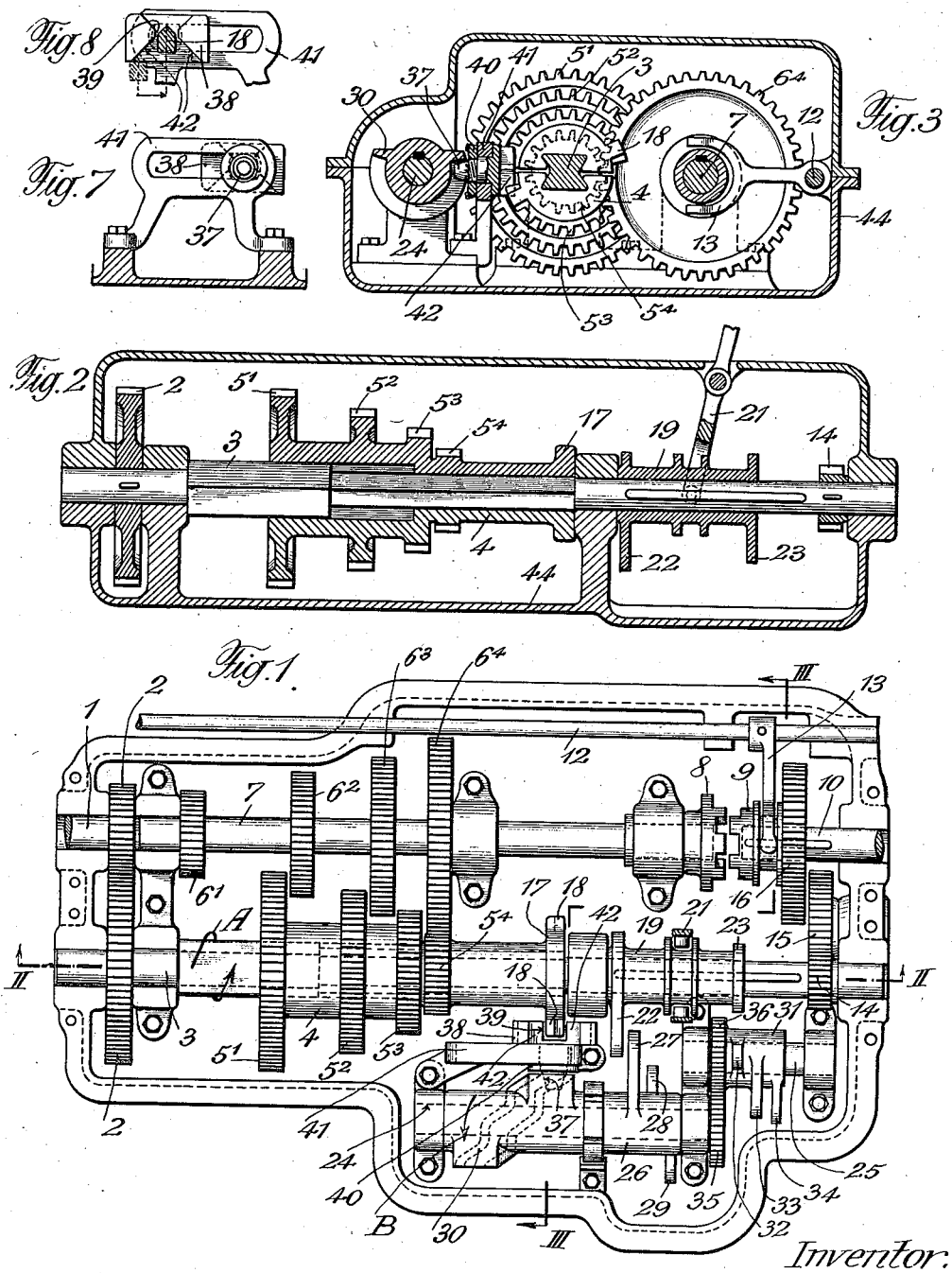

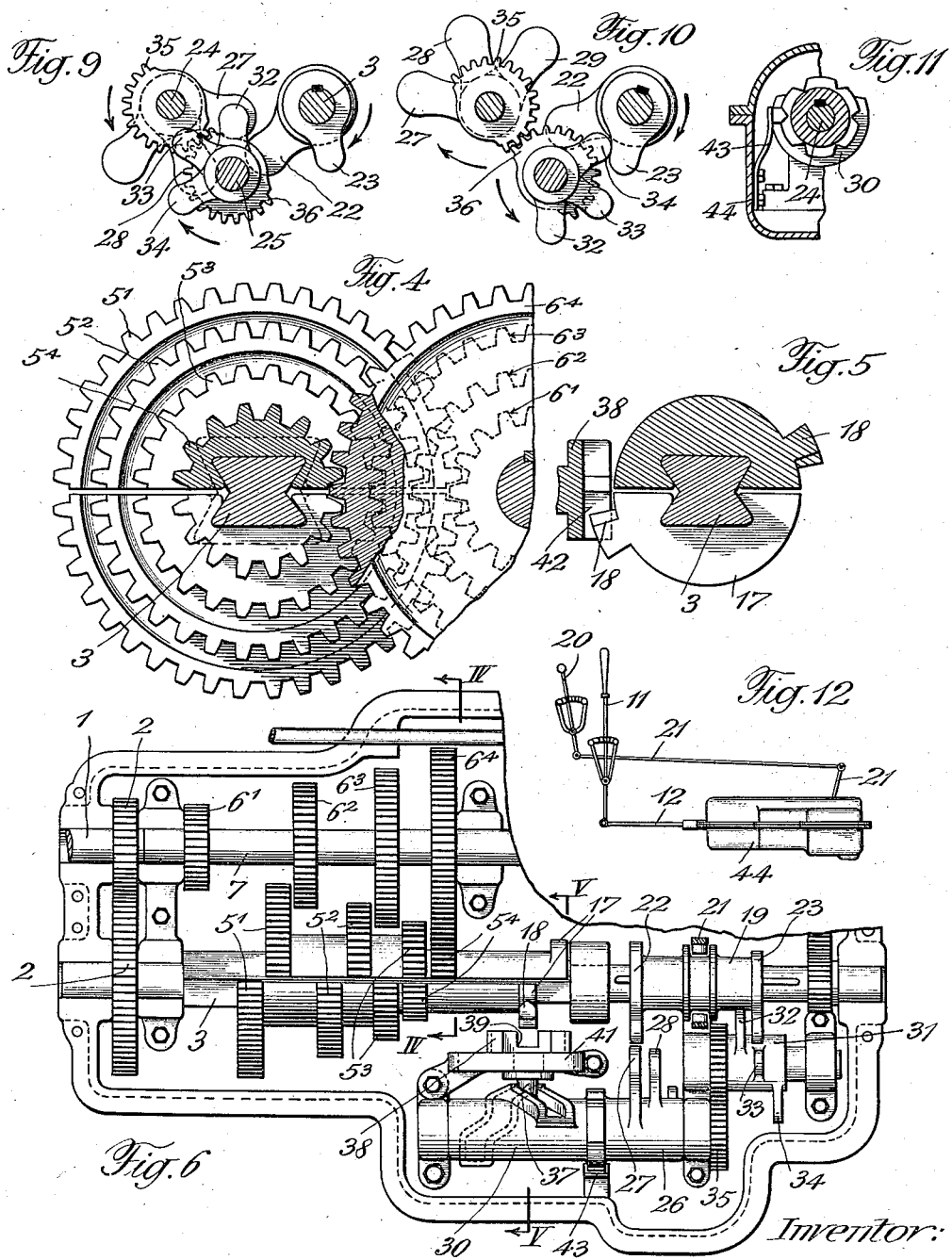

J. K. OTT.
CHANGE SPEED GEAR.
APPLICATION FILED MAR. 6, 1918.
1,277,251.
Patented Aug. 27, 1918.
7 SHEETS—SHEET 4.
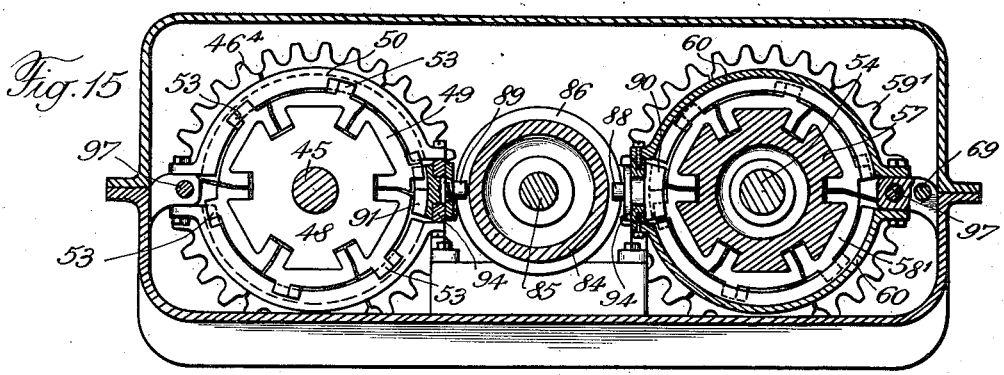
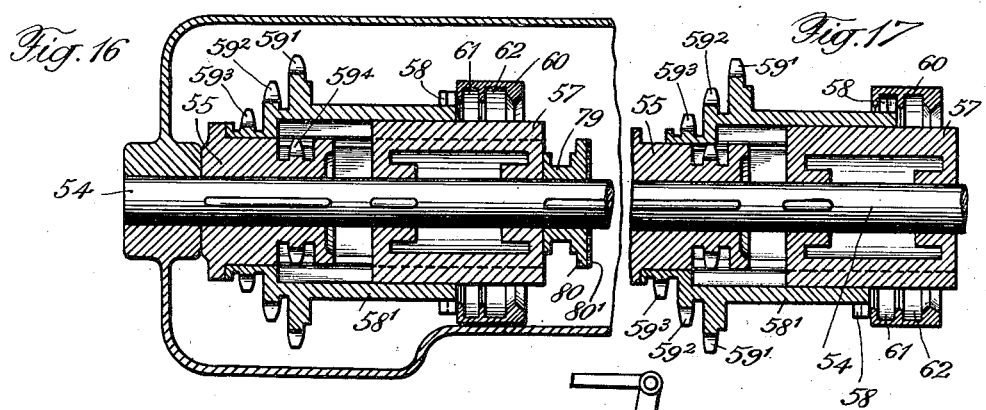
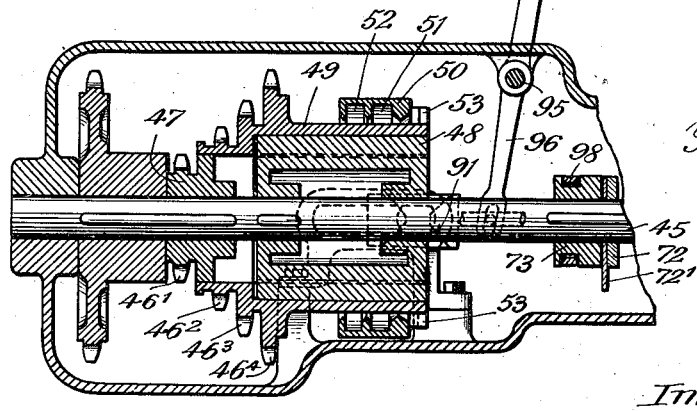
Inventor:
Johann Klaus Ott,
By
Atty.

J. K. OTT.
CHANGE SPEED GEAR.
APPLICATION FILED MAR. 6, 1918.

1,277,251.

Patented Aug. 27, 1918.
7 SHEETS—SHEET 5.

Inventor:
Johann Klaus Ott,
By
Atty.

J. K. OTT.
CHANGE SPEED GEAR.
APPLICATION FILED MAR. 6, 1918.
1,277,251.
Patented Aug. 27, 1918.
7 SHEETS—SHEET 6.
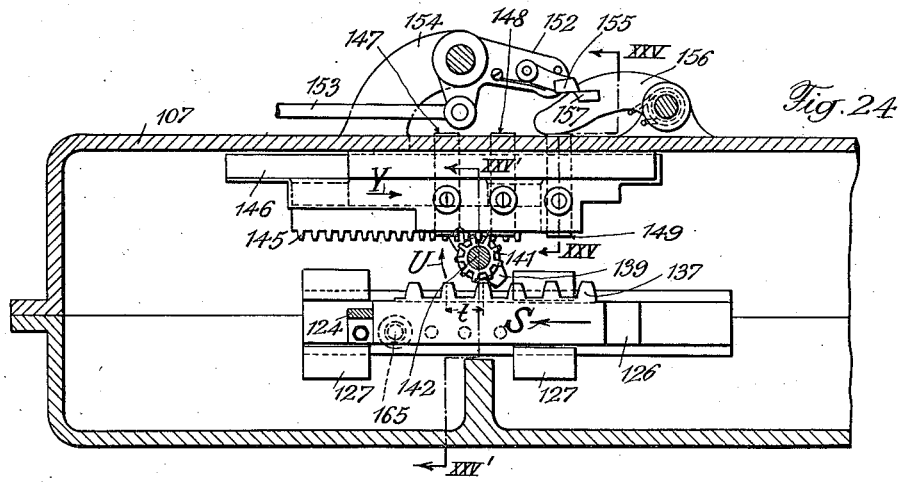
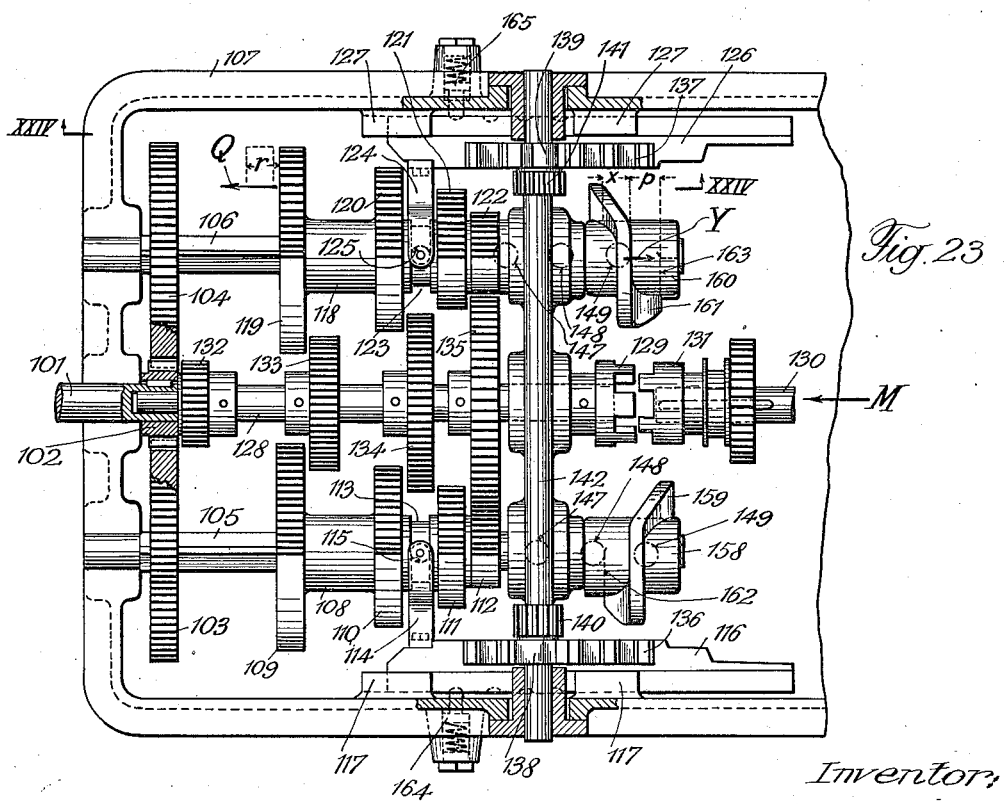
Inventor:
Johann Klaus Ott,
By Henry Orth
Atty.

J. K. OTT.
CHANGE SPEED GEAR.
APPLICATION FILED MAR. 6, 1918.
1,277,251.
Patented Aug. 27, 1918.
7 SHEETS—SHEET 7.
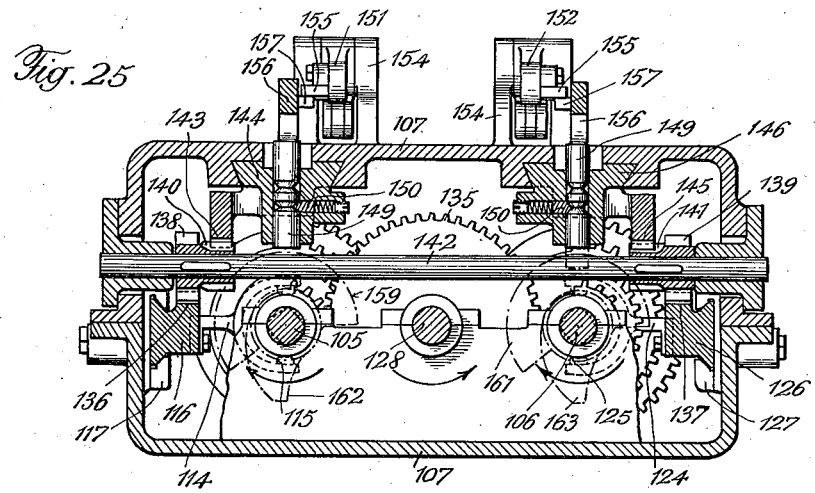
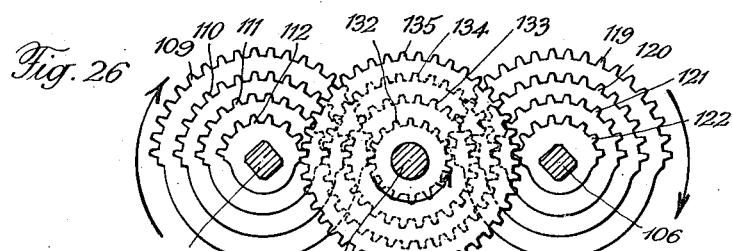
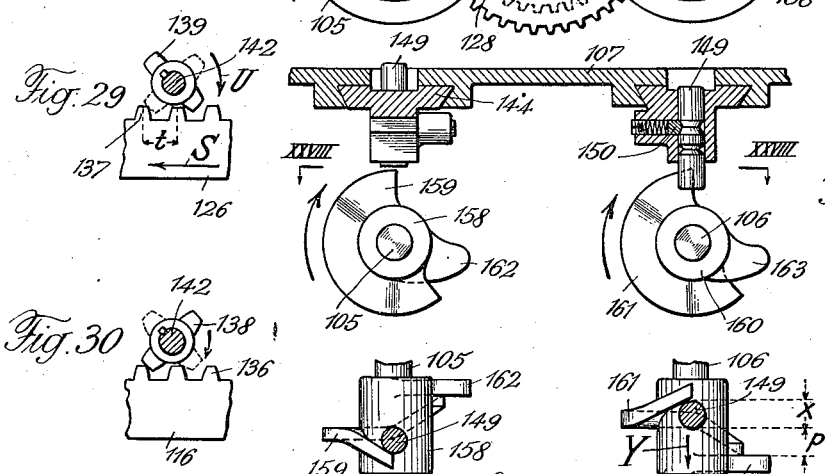

UNITED STATES PATENT OFFICE.

JOHANN KLAUS OTT, OF BISCHOFSZELL, SWITZERLAND.

CHANGE-SPEED GEAR.

1,277,251.

Specification of Letters Patent.

Patented Aug. 27, 1918.

Application filed March 6, 1918. Serial No. 220,745.

*To all whom it may concern:*

Be it known that I, JOHANN KLAUS OTT, a citizen of the Republic of Switzerland, residing at Bischofszell, Switzerland, have invented certain new and useful Improvements in Change-Speed Gears; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention has reference to a change speed gear in which members of at least one of the two groups, driving members and driven members, are subdivided at least into two portions and which comprises means for effecting a speed change, adapted to displace successively the single portions of the subdivided members during an interval of time at which said single portions do not come momentarily into consideration for the transmission of motion.

When the change speed gear comprises toothed rims of different diameter gearing with one another and operatively connected to a driving and driven shaft respectively, the driving toothed rims are preferably provided on a sleeve subdivided into two portions of semicylindrical shape, each of said two portions being adapted to be shifted singly in the longitudinal direction of the driving shaft.

When, on the other hand, the motion is transmitted from the driving to the driven shaft by means of a chain, I fix to each of said shafts a sprocket-wheel, while other sprocket-wheels, also provided on said shafts, constitute toothed rims of sleeves each of which consists of several segments adapted to be displaced singly in the longitudinal direction of the shaft carrying the sleeve.

According to the present invention, the driving toothed rims may also be distributed over two sleeves mounted on two auxiliary shafts, each of said sleeves being adapted to be displaced singly in the longitudinal direction of its shaft.

The invention will now be more particularly described with reference to the accompanying drawings illustrating by way of example several embodiments of the invention.

In these drawings:

Figure 1 is a plan view of a change speed gear comprising toothed wheels;

Fig. 2 is a section on the line II—II of Fig. 1,

Fig. 3 is a section on the line III—III of Fig. 1,

Fig. 4 is a section on the line IV—IV of Fig. 6 illustrating some parts of the toothed wheels of the first rate of speed in section.

Fig. 5 is a section on the line V—V of Fig. 6.

Fig. 6 is a plan view corresponding to Fig. 1, illustrating some parts in another position.

Figs. 7 to 11 illustrate details of this construction.

Fig. 12 shows diagrammatically the arrangements of levers and rods connected therewith adapted to be used for influencing the change speed gear.

Fig. 13 is a plan view of a change speed gear comprising driving chains.

Fig. 14 is a section on the line XIV—XIV of Fig. 13,

Figure 19:
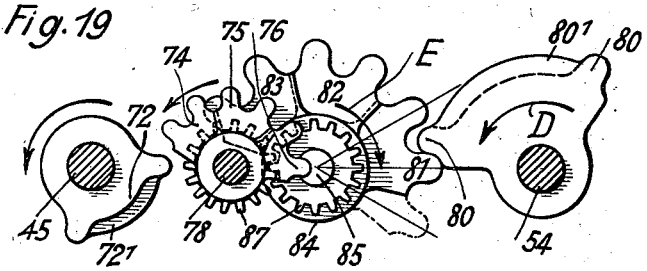

Fig. 15 a section on the line XV—XV of Fig. 13,

Fig. 16 a section on the line XVI—XVI of Fig. 13.

Fig. 17 is a cross-section corresponding substantially to Fig. 16, illustrating the parts in another position;

Fig. 18 is a cross-section on the line XVIII—XVIII of Fig. 13 and

Figs. 19 to 22 illustrate details of the second embodiment.

Fig. 23 is a plan view of a construction comprising two auxiliary shafts, each of which carries a sleeve adapted to be displaced in the longitudinal direction of its shaft, the driving toothed rims being distributed over said two sleeves.

Fig. 24 is a section on the line XXIV—XXIV of Fig. 23,

Fig. 25 is a section partly on the line XXV—XXV and partly on the line XXV'—XXV' of Fig. 24.

Fig. 26 is a view seen in the direction of the arrow M of Fig. 23 of some toothed wheels and sleeves provided with toothed portions of the change speed gear.

Fig. 27 shows, partly in section, details of this third embodiment of the invention;

Fig. 28 is a section on the line XXVIII—XXVIII of Fig. 27 and

Figs. 29 and 30 illustrate further details of this third construction.

Referring to Figs. 1 to 12 illustrating a change speed gear for motor cars, 1 denotes the shaft of the motor transmitting its motion to an intermediate shaft 3 by means of a toothed wheel 2. A portion of the shaft 3 has a double dovetailed cross-section (Figs. 2, 4, 5). 4 denotes a sleeve keyed on the shaft 3 and adapted to be adjusted in the longitudinal direction of the latter. Said sleeve 4 is provided with four toothed rims $5^1$, $5^2$, $5^3$, $5^4$. 7 is a shaft arranged coaxially to the shaft 1 of the motor. To the shaft 7 are fixed four toothed wheels $6^1$, $6^2$, $6^3$, $6^4$. Each of the latter is adapted to gear with the toothed rim of the sleeve 4 having the same exponent. The shaft 7 carries on one of its ends one half 8 of a claw coupling adapted to coöperate with the second half 9 of said coupling keyed on the shaft 10. The motion is then transmitted in this case from the shaft 10 to the driving axles not illustrated on the drawings. The coupling part 9 is adapted to be adjusted in the longitudinal direction of the shaft 10 by means of a lever 11 (Fig. 12) connected to a rod 12 carrying a fork-shaped arm 13. (Figs. 1, 3).

The shaft 3 carries near its right hand end a toothed wheel 14 gearing with an intermediate toothed wheel 15. A toothed wheel 16 formed integral with the coupling part 9 can be brought to engage said wheel 15, the motion being transmitted in this case directly from the shaft 3 to the shaft 10, so that the car is driven in a reverse direction.

The sleeve 4 consists of two semicylindrical portions or halves, each of which is provided with an enlarged end 17 fitted with a cam 18. On the shaft 3 is also keyed a sleeve 19 adapted to be displaced in the longitudinal direction of said shaft 3 by means of a lever 20. (Fig. 12) connected to a rod 21 (Figs. 12 and 2). The sleeve 19 is provided with two cams 22 and 23.

24 and 25 denote two shafts. Shaft 24 carries a sleeve 26 provided with three cams 27, 28 and 29 and a drum 30 having a cam-groove. The parts 26 and 30 are keyed on the shaft 24. Shaft 25 carries in its turn a sleeve 31 keyed on it and provided with three cams 32, 33, 34. 35 and 36 denote two toothed segments adapted to engage one another, one of said segments being fixed to the shaft 24 and the other one to the shaft 25.

37 (Fig. 6) denotes a pin provided on a sliding member 38. Said pin 37 is adapted to engage the cam-groove of the drum 30. The sliding member 38 has on the side lying opposite the pin 37 a recess 39 in which said cams 18 of the revolving sleeve 4 may rotate unhindered. The sliding member 38 is also provided with slanting surfaces 42 (Fig. 8). Onto the member 38 is screwed a nut 40 effecting together with a fixed rail 41 a proper guidance of said sliding member 38.

43 (Fig. 11) denotes a resilient member fixed to the casing 44 and adapted to secure the shaft 24, and therefore also the drum 30, in a determinate position.

The operation of the hereinbefore described change speed gear is as follows:

Let it be assumed, that the parts are at first in the position illustrated in Fig. 1. Shaft 1 then drives shaft 3 in the direction of the arrow A and the motion of said shaft 3 is transmitted by the toothed rim $5^4$ of the toothed wheel $6^4$ fixed to the shaft 7. In case that the coupling part 9 engages also into the coupling part 8, the car is then driven at the first rate of speed in a forward direction. Thereby, the cams 18 are rotating in the recess 39 and the cams 22, 23 of the sleeve 19 do not act in any way upon the cams 27, 28, 29 of the sleeve 26 and the cams 32, 33, 34 of the sleeves 31 respectively.

Should it now be desired to change over from first to second speed, the sleeve 19 is adjusted in such a manner in the longitudinal direction of the shaft 3 by means of lever 20 that the revolving cam 22 is caused to strike from beneath against the cam 27 of the sleeve 26. (Figs. 9, 6) so that it effects a rotation of the drum 30 in the direction of the arrow B (Fig. 1). The toothed segments 35, 36 rotate thereby simultaneously the shaft 25 so that none of the cams of the sleeve 31 can be acted upon by cam 23. In consequence of the coöperation of the projection 37 with the cam-groove of the drum 30, said rotation of the drum 30 causes also a displacement of the sliding member 38 toward the left, so that the cam 18 of the portion of the sleeve 4 striking first against the member 38 upon the displacement of the latter, does now not coöperate with the recess 39, but strikes against the slanting surface 42 (Fig. 8) of the member 38. Said surface 42 guides, however, the cam 18 in the course of its further rotation, into the recess 39, causing thereby a movement of the sleeve-half 4 provided with said cam 18 to move toward the left, i. e. into the position shown in Fig. 6. The result of this is, that one half of the toothed rim $5^4$ is moved outside the path of movement of the toothed wheel $6^4$. The coöperation of the surface 42 with the cam 18 can be determined in such a manner, that the displacement referred to of said half of the sleeve 4 is brought about just when the two halves of the toothed rim $5^4$ are in the position illustrated in Fig. 4, or immediately after they have been moved past said position.

It will be seen, that the two halves of the sleeve 4 are displaced during an interval of time, at which the parts 5⁴ to be shifted do not transmit momentarily any motion or power to the toothed wheel 6⁴.

The shifted halves of the other toothed rims of said displaced sleeve portion 4 are prevented for the time being from engaging with any of the toothed wheels 6¹, 6², 6³. It is thus possible to displace in the hereinbefore described construction one half of the sleeve 4 during a period at which its teeth are not subjected to any stress.

In the course of the further rotation of the shaft 3, the cam 18 of the second half of the sleeve 4 causes then in consequence of its coöperation with a slanting surface 42 a displacement of said half to an amount toward the left corresponding to the amount of displacement of the first displaced half of the sleeve 4, the arrangement being again such, that the second half of the toothed rim 5⁴ is just displaced during an interval of time, at which it does not transmit momentarily any motion to the toothed wheel 6⁴.

While the displacement of the second half of the sleeve 4 is effected, the half of the toothed rim 5³ provided on the first displaced half of the sleeve 4, so engages the toothed wheel 6³, that the transmission of the movement from the shaft 3 to the shaft 7 is wholly secured.

In this manner it is possible to change over from one speed to another, without the teeth to be brought into engagement being subjected to too great stresses and without causing any noise. These advantages are due to the fact, that the change of speed is always effected in consequence of an axial displacement of those portions the teeth of which have to be brought into engagement with another wheel, and not by pushing the teeth of one wheel in a radial direction into the spaces of the teeth of the other wheel. Of course, the diameters of the wheels 6¹, 6², 6³, 6⁴ and of the toothed rims 5¹, 5², 5³, 5⁴ as well as the dimensions of the teeth of these parts must be chosen in such a manner, that when two parts of one ratio of gearing are still in engagement, while the transmission of the power is already effected by parts of the next ratio of gearing, as it is the case, for instance, immediately before the shifting of the second half of the toothed rim 5⁴, the difference of the peripheral speeds of the parts of the two speeds of gearing remain within permissible limits.

On a further actuation of the lever 20, the cam 22 may be caused to coöperate with the cam 28, the third speed being then put in in a similar manner to that hereinbefore described with regard to the second speed. Should it be desired to put in the fourth speed, the cam 22 has to be brought to coöperate with the cam 29. During all this time the toothed segments 35, 36 drive the shaft 25 so, that the cam 23 is prevented from acting upon any of the cams 32, 33, 34.

When, on the other hand, it is desired to change over from a higher to a lower speed, for instance from the fourth to the third, the lever 20 has to be moved in the opposite direction until the cam 23 strikes in the manner illustrated in Fig. 10 against the cam 34. The parts 36, 35, 30, 37, 38 then effect, in the same manner as it has been hereinbefore described, at first a displacement of one and then of the other half of the sleeve 4 toward the right, so that the two halves of the toothed rim 5¹ are thrown out of engagement with the toothed rim 6¹ while the two halves of the toothed rim 5² are caused to engage into the toothed wheel 6².

During the changing over from a higher speed to a lower one, the shaft 24 is rotated in such a manner by the toothed segments 36, 35, that the cam 22 is prevented from acting upon any of the cams 27, 28, 29.

Figs. 13 to 22 illustrate a change speed gear according to the present invention in which the transmission of the motion is not effected by toothed wheels gearing with one another, but by driving chains.

Referring to these figures, 43 denotes the shaft of the motor. The motion of said shaft 43 is transmitted to a shaft 45 by means of a driving chain 44. To the shaft 45 is fixed a sleeve-like body 47 (Fig. 18) provided with a toothed rim 46¹. To the shaft 45 is also fixed a drum 48 on which is keyed a sleeve 49 provided with three toothed rims 46², 46³, 46⁴ and adapted to be adjusted in the longitudinal direction of said shaft 45 and to be rotated together with the latter. The sleeve 49 and its toothed rims are subdivided in the manner illustrated in Fig. 14 into six segmental portions. 50 denotes a guide member consisting of two annular, stationary parts (Fig. 15) and provided with two annular grooves 51, 52. The latter are adapted to coöperate with six cams 53 provided on the sleeve 49. The cams 53 bear in the position shown in Fig. 18 against the right hand side of the guide member 50, in order to prevent in this case a displacement of the sleeve 49 toward the left.

54 denotes a shaft arranged parallel to the shaft 45 carrying a sleeve 55 fixed to said shaft 45 and provided with a toothed rim 59⁴. To the shaft 54 is further fixed a drum 57 on which is mounted a sleeve 58¹ provided with three toothed rims 59¹, 59² and 59³ and adapted to be displaced in the longitudinal direction of said drum 57 and to be rotated together with the shaft 54. The sleeve 58¹ and its toothed rims are also subdivided in the manner illustrated in Fig. 14 into six segmental portions. 60 is a fixed guide member divided into two portions. Said member 60 is provided with two annular grooves 61, 62 adapted to coöperate with six cams 58 provided on the sleeve $58^1$. When the sleeve $58^1$ is in the position illustrated in Fig. 16, said cams 58 bear against the left hand side of the guide member 60 and prevent in this position an adjustment of the sleeve $58^1$ toward the right.

63 denotes a driving chain adapted to coöperate with one of the toothed rims $46^1$, $46^2$, $46^3$, or $46^4$ respectively, and one of the toothed rims $59^1$, $59^2$, $59^3$, or $59^4$ respectively, in order to transmit the motion of the shaft 45 to the shaft 54. The latter carries on its right hand end a coupling part $63^1$ adapted to engage a coupling part 64 on a shaft 65. The shaft 65 carries also a toothed wheel 66 adapted to coöperate by means of toothed wheels 67 with a toothed wheel 68 keyed on the shaft 45 and adapted to be displaced in the longitudinal direction of the latter. When the toothed wheels 66, 67, 68 are meshing, the parts $63^1$ and 64 are thrown out of engagement and the car then runs backward. The coupling part 64 can be adjusted by acting upon a hand lever arranged near the driver's seat (not shown in the drawings) and connected to a rod 69 carrying an arm 70, the actuation of said hand lever causing at the same time also an actuation of a lever 71 adapted to displace the toothed wheel 68 in the longitudinal direction of the shaft 45.

On the shaft 45 is further keyed a sleeve 73 adapted to be adjusted in the longitudinal direction of the shaft 45 and provided with a cam 72 having two teeth.

According to the momentary position of said sleeve 73, the cam 72 coöperates either with the one or the other of the cams 74, 75, 76 provided on a sleeve 77 fixed to the shaft 78. Each of the cams 74, 75, 76 has the shape of a segment provided with two teeth.

On the shaft 54 is keyed a sleeve 79 adapted to be displaced in the longitudinal direction of said shaft 54 and having a segment-shaped cam 80 provided with two teeth. Said cam 80 is adapted to coöperate, according to the position just taken up by the sleeve 79, either with the cam 81, 82, or 83 respectively, provided on a sleeve 84 having a cam-groove 86 and each consisting of a segment-shaped part having two teeth. The sleeve 84 is fixed to a shaft 85 operatively connected to the shaft 78 by means of toothed wheels 87. The sleeve 84 has also an annular groove provided with recesses $84^1$ into which may engage an automatic catch $84^2$.

88 and 89 denote pins corresponding to the pin 37 of the first embodiment described and adapted to engage into the groove 86. Each of said pins forms a part of a sliding member 90 and 91 respectively. The member 90 has an annular recess 92 and the member 91 has a corresponding recess 93. Said members 90 and 91 are also provided, in the same manner as the member 38 hereinbefore referred to, with inclined guide-surfaces. Upon a suitable adjustment of said sliding members, the cams 53 and 58 are adapted to move unhindered in the circular recesses 93 and 92 respectively. 94 denotes stationary rails corresponding to the rail 41 of the first construction and acting as guides for the sliding members 90 and 91. As shown in Fig. 15, an end of one half of the guide pieces 50 and 60 respectively, is fixed to the rails 94.

The second construction works as follows:

Let it be assumed that the parts are in the position shown in Fig. 13 and that the coupling parts $63^1$, 64 are engaging one another. Let it be further assumed, that the shaft 45 rotates in the direction of the arrow C. The shaft 54 is then rotated at the lowest speed in the direction of the arrow D, the cams 53 and 58 moving thereby unhindered in the recesses 93 and 92 respectively.

When it is desired to effect a change of speed in such a sense, that the shaft 54 is driven at the second speed, the sleeves 73 and 79 are adjusted in such a manner by means of the members 95, 96 (Fig. 14) and 97 and 98 operatively connected to a hand lever arranged near the driver's seat, that the cam 80 is moved into the path of movement of the cam 81 (Fig. 19). Owing to the provision of a guide-face $80^1$ (Fig. 19) on the cam 80, said adjustment can only be effected when the two teeth of the cam 80 are with regard to the front tooth of the cam 81 on the same and not on different sides. The front tooth of the cam 80 then strikes upon a further rotation of the shaft 54 in the direction of the arrow D, against one of the teeth of the cam 81 (Fig. 19). This causes a rotation of the sleeve 84 in the direction of the arrow E to such an amount, that the pin 88 is shifted by the cam-groove 86 to an amount —a— (Fig. 20) toward the right. In consequence of this, the cams 58 are caused to strike against a slanting surface of the sliding member 90, said cams 58 being thereby displaced until they are again forced into the recess 92; the displacement of said cams 58 then causes a successive displacement of the portions of the sleeve $58^1$ and of the toothed rims provided on said portions toward the right into the position illustrated in Fig. 17. The cams 58 are then caused to rotate in the annular groove 61, while the chain 63 runs over the toothed rim $59^2$.

Figure 20:
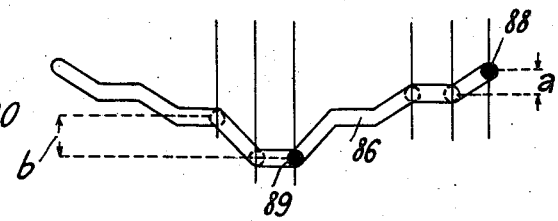

Owing to the peculiar shape of the cam-groove 86, the displacement of the sliding member 90 to the amount —a— (Fig. 20)

toward the right does not cause at first any displacement of the member 91 in the longitudinal direction of the shaft 45. As soon as, however, the rear tooth of the cam 80 strikes in the further course of rotation of said cam 80 against the rear tooth of the cam 81, a further rotation of the sleeve 84 in the direction of the arrow E is brought about. In consequence of the shape of the cam-groove 86, no displacement of the sliding member 90 in the longitudinal direction of the shaft 65 is then effected, while on the other hand the sliding member 91 is now moved to an amount —$b$— (Fig. 20) toward the left. The result of this is, that the cams 53 strike in the course of their rotation against one of the slanting surfaces of the sliding member 91 causing thereby a movement of that portion of the sleeve 49 on which said cams 53 are provided toward the left until the cams 53 are again caused to pass into the recess 93. Owing to the displacement of the single portions of the sleeve 49 together with the toothed rims provided on them, the driving chain 63 is forced to run over the toothed rim $46^2$. By providing for a suitable coöperation between the cams 58 and 53 and the slanting surfaces of the sliding members 90 and 91 respectively, the displacement of the portions of the sleeves $58^1$ and 49 can be brought about also in this construction just during an interval of time at which the portions of the toothed rims provided on said sleeves are not in engagement with the driving chain 63, this being the case, as shown in Fig. 14, over an extent corresponding approximately to the circumference of two toothed segment-portions.

By further adjusting the sleeves 79, 73 in the sense referred to, the driving chain 63 can be caused to engage into the toothed rims $46^3$, $59^3$ and $46^4$, $59^4$ respectively, this being brought about by a coöperation of the cam 80 with the cams 82 and 83 respectively.

When changing over from a lower speed of the shaft 54 to a higher one, the cam 72 is prevented from acting upon any of the cams 74, 75, 76 of the sleeve 77 receiving a rotating movement from the shaft 78 operatively connected to the shaft 85 by means of the toothed wheels 87.

Figure 21:
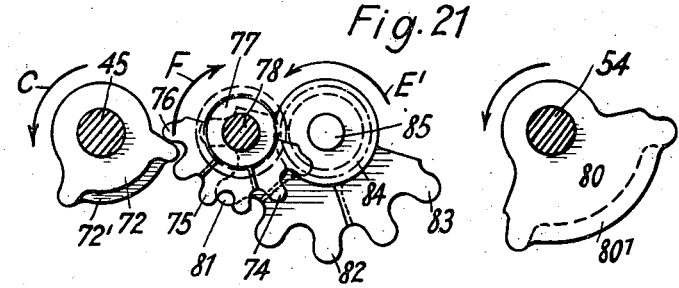
Figure 22:
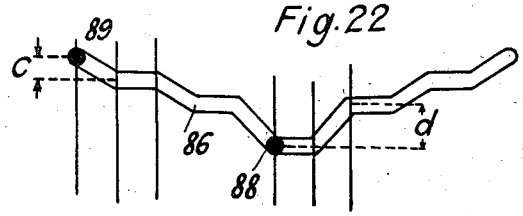

When, on the other hand, it is desired to change over from a higher speed of the shaft 54 to a lower one, for instance from the third speed to the second, the hereinbefore mentioned hand lever is moved in the opposite direction until the sleeve 73 is moved by the parts 95, 96, 97, 98 into a position in which the cam 72 provided with two teeth is adapted to act in the manner illustrated in Fig. 21 upon the cam 76 of the sleeve 77. The cam 72 moving in the direction of the arrow C causes at first a rotation of the sleeve 84 in the direction of the arrow $E^1$ (Fig. 21) until the sliding member 91 is moved to an amount —$c$— (Fig. 22) toward the right. Hereupon the second tooth of the cam 72 effects a further rotation of the sleeve 77 in the direction of the arrow F to such an amount, that the sliding member 90 is moved to the amount —$d$— (Fig. 22) toward the left. In consequence of this, the sleeve portions 49 and $58^1$, together with the toothed rims provided on them, are moved to corresponding amounts toward the right and left respectively, so that the chain 63 is caused to coöperate with the toothed rims $46^3$ and $59^3$. The arrangement is such, that when the cam 72 acts either upon the cam 76 or the cams 75, 74 respectively, the sleeve 84 is rotated in such a manner by the toothed wheels 87, that the cam 80 is prevented from acting upon any of the cams 81, 82, 83. Also in this construction, a guide surface $72^1$ provided on the cam 72 prevents an adjustment of the latter when the two teeth of said cam 72 are situated on different sides of the front tooth of the cams 74, 75, 76.

Upon a further displacement of the sleeve 73 in the last mentioned direction, the chain 63 can be caused to coöperate with the toothed rims $46^2$, $59^2$ and $46^1$, $59^1$ respectively. Thereby, the displacement of the portions of the sleeves 49 and $58^1$ is again effected just during an interval of time at which not any of the toothed rims provided on said sleeves is in engagement with the driving chain.

Referring to the third construction according to the present invention illustrated in Figs. 23 to 30, 101 denotes the shaft of the motor. To this shaft is fixed a toothed wheel 102 engaging with two toothed wheels 103 and 104. The toothed wheel 103 is fixed to an auxiliary shaft 105 and the toothed wheel 104 to an auxiliary shaft 106. The auxiliary shafts 105 and 106 are supported in the casing 107 and the greatest portion of them has, as illustrated in Figs. 23 and 26, a square cross-section. On the auxiliary shaft 105 is keyed a sleeve 108 adapted to be adjusted in the longitudinal direction of said shaft 105. The sleeve 108 has four circular rims 109, 110, 111 and 112. Each of these rims is provided over one half of its circumference with teeth. The sleeve 108 has also a circular groove 113 into which project pins 115 (Figs. 23 and 25) of a fork-shaped member 114. The latter is fixed to a slide 116 adapted to reciprocate in guides 117 of the casing 107.

On the auxiliary shaft 106 is keyed a sleeve 118 adapted to be adjusted in the longitudinal direction of the shaft 106. The sleeve 118 has four circular rims 119, 120, 121 and 122 which, as shown in Fig. 26, are also provided over one half of their circumference with teeth. The sleeve 118 has also an annular recess 123 into which project pins 125 of a fork-shaped member 124. The latter is fixed to a slide 126 adapted to reciprocate in guides 127 of the casing 107.

128 denotes a shaft arranged coaxially to the shaft 101 of the motor. The shaft 128 is supported at one end in the shaft 101, while at the other end it carries one half 129 of a claw coupling, the other half 131 of which is keyed and slidably mounted on a shaft 130. On the shaft 128 are also keyed four toothed wheels 132, 133, 134 and 135. The toothed wheel 132 is adapted to coöperate with the toothed portion of the rims 109 and 119, the toothed wheel 133 with the toothed portion of the rims 110 and 120, the toothed wheel 134 with the toothed portion of the rims 111 and 121 and the toothed wheel 135 with the toothed portion of the rims 112, 122. As the toothed portions of the rims 109, 119, 110, 120, 111, 121, 112, 122 extend just over one half of the circumference of said rims, it will be seen that the driving toothed rims are subdivided in this construction into two portions, one of these portions being carried by the auxiliary shaft 105 and the other one by the shaft 106. The arrangement is thereby such, that the toothed rim portion of the sleeve 108 coöperating with the toothed wheel 132, 133, 134, or 135 respectively, is thrown out of engagement with the toothed wheel fixed to the shaft 128, when the toothed portion provided on the rim of the same diameter of the sleeve 118 is caused to engage a toothed wheel of the shaft 128, or immediately afterward.

Each slide 116, 126 carries a toothed rack 136 and 137 respectively. The rack 136 coöperates with a double cam 138 (Fig. 25) and the rack 137 with a double cam 139. The cam 138 is formed integral with a toothed wheel 140 and the cam 139 with a toothed wheel 141. The toothed wheels 140, 141 are keyed on a common shaft 142 supported in the casing 107. The toothed wheel 140 is adapted to engage a rack 143 fixed to a movable slide 144 guided in the casing 107. The toothed wheel 141 is, in its turn, adapted to engage a rack 145 fixed to a movable slide 146 also guided in the casing 107. In each slide 144, 146 are mounted three vertically movable pins 147, 148, 149 (Figs. 24, 23). 150 (Fig. 25) denotes pins acted upon by springs and adapted to engage annular recesses of said pins 147, 148, 149, in order to fix the latter in a lower or uppermost position.

151 and 152 denote levers pivotally mounted in arms 154 secured to the casing 107. Each lever carries at one end a nose 155 (Fig. 24) acted upon by a spring, while at the other end it is connected with a tension member 153 extending toward the driver's seat. On the top of the casing 107 are pivotally mounted two arms 156. Each of the latter carries a nose 157 adapted to coöperate with the nose 155 of one of the levers 151 and 152 respectively.

To the auxiliary shaft 105 is also fixed a sleeve 158 provided on its circumference with a cam 159. To the auxiliary shaft 106 is fixed a sleeve 160 provided on its circumference with a cam 161. Each sleeve 158, 160 is further fitted with a cam 162 and 163 respectively (Figs. 23, 27 and 28). Cam 161 is arranged, seen in Fig. 23, immediately on the left of cam 159 and cam 163 immediately on the right of the cam 161. 164 and 165 are spring actuated stop-mechanisms adapted to coöperate with the slides 116 and 126 respectively.

This third construction according to the present invention works as follows:

Let it be assumed that the parts are in the position illustrated in Fig. 23. Shaft 101 drives the auxiliary shafts 105 and 106 by means of the toothed wheels 102 and 103 and 104 respectively. The motion of the auxiliary shafts 105 and 106 is transmitted to the shaft 128 by means of the toothed portions of the rims 112 and 122 engaging alternately into the toothed wheel 135. When, moreover, also the coupling parts 129 and 131 are caused to engage each other, the car is then driven at the first speed in a forward direction.

Should it now be desired to change over from the first to the second speed, the lever 152, situated in Fig. 25 on the right hand side, is moved by means of the tension member connected to it and extending toward the driver's seat in such a manner, that the nose 155 coöperating with the nose 157 of the arm 156 arranged near said lever 152 presses the arm 156 downward. The latter presses the pin 149 which is just situated in its path of movement downward. The cam 161 of the sleeve 160 keyed on the auxiliary shaft 106 effects, as soon as it is caused to coöperate in the manner illustrated on the right of Fig. 28 with said pin 149, at first a displacement of the slide 146 to the amount —$x$— (Figs. 23 and 28) in the direction of the arrow Y. Owing to the coöperation of the rack 145 fixed to the slide 146 with the toothed wheel 141, the cam 139 taking up at the beginning of the coöperation of the cam 161 with the pin 149 the position shown in Fig. 29 in full lines, is rotated in the direction of the arrow U (Figs. 24 and 29), so that the rack 137, and thus also the slide 126 is moved to the amount —$t$— in the direction of the arrow S shown in Figs. 24 and 29. This causes a displacement of the sleeve 118 to the amount —$r$— in the direction of the arrow Q shown in Fig. 23, so that the toothed portion of the rim 121 is now able to engage the toothed wheel 134. Thereby, the different parts are so arranged, that the displacement of the sleeve 118 in the direction of the arrow Q is just effected in the position of the toothed rim portions illustrated in Fig. 26, i. e. during the interval of time at which the toothed portion of the rim 122 is out of engagement with the toothed wheel 135.

The rotation imparted to the shaft 142 by the toothed wheel 141 has the effect to rotate the cam 138 formed integral with the toothed wheel 140 from the position shown in Fig. 30 in full lines and which it assumes at the beginning of the coöperation of the cam 161 with the pin 149, into the position shown in Fig. 30 in dotted lines, so that no displacement is imparted to the slide 116 during the displacement of the slide 126. In the course of the further rotation of the sleeve 160, the pin 149 is caused to coöperate with that portion of the cam 161 which is situated, seen in Fig. 23, at right angles to the axis of the auxiliary shaft 106. In this case neither the slide 126 nor the slide 116 is displaced. However, as soon as the second oblique portion of the cam 161 adjoining the straight portion of the latter is caused to coöperate with the pin 149, the slide 146 is displaced to a further amount —p— in the direction of the arrow Y shown in Figs. 23 and 28. The consequence of this is, that the cams 139 and 138 are moved from the positions shown in Figs. 29 and 30 in dotted lines again into those shown in full lines. No displacement is thereby imparted to the rack 137, and therefore to the slide 126, while the rack 136 and therefore the slide 116, is moved to the amount —t— in the direction of the arrow S of Fig. 24, so that also the sleeve 108 is displaced to said amount in the direction of the arrow Q of Fig. 23. As a result of this, the rims 111 and 112 are moved into such positions, that the toothed portion of the rim 112 is no longer able to engage into the toothed wheel 135, while the toothed portion of the rim 111 is now able to engage with the toothed wheel 134. Thereby, the displacement of the sleeve 108 is just effected during an interval of time at which the toothed portion of the rim 112 does not engage the toothed wheel 135, or only shortly before this moment and immediately after that the toothed portion of the rim 111 engages the toothed wheel 134. The shaft 128 rotates now at the second speed and the slides 144, 146 are in such a position, that the pin 148 is now situated in the path of movement of the pivotally mounted arm 156. The pin 149 has been moved again into its uppermost position by the cam 163 immediately after it has come out of engagement with the cam 161.

Upon a further oscillation of the lever 152, the pin 148 situated in the path of movement of the arm 152 will be pressed downward effecting thereby in a similar manner to that described with regard to the pin 149 a changing over from the second to the third speed and upon a further rotation of said lever 152 the throwing in of the fourth speed may be effected.

When, on the other hand, it is desired to change over from a higher to a lower speed, the lever 151 situated in Fig. 25 on the left hand side, has to be oscillated by pulling on the member 153 connected therewith. The pin 147, 148, or 149 respectively, just situated in the path of movement of said member 151, is then caused to coöperate with the cam 159 (see left hand side of Fig. 28) effecting thereby a displacement of the slide 144, seen in Fig. 23, from the right to the left. In consequence of this, at first the sleeve 108 and then the sleeve 118 will be displaced to such an amount from the left to the right, that the motion is transmitted at the next smaller speed from the auxiliary shafts 105 and 106 to the shaft 128.

What I claim now as my invention is:

1. A change speed gear, comprising a group of driving members, a group of driven members, the driving members being adapted to coöperate with said driven members and the members of one of said groups being subdivided into portions, and means adapted to displace successively the single portions of the subdivided members during an interval of time at which said portions do not come momentarily into coöperation with the driven members for the transmission of motion.

2. A change speed gear, comprising a group of driving members, the members of this group being subdivided into two portions, a group of driven members, adapted to coöperate with the driving members, and means adapted to displace successively the two portions of the subdivided driving members during an interval of time at which said portions do not come momentarily into coöperation with the driven members for the transmission of motion.

3. A change speed gear, comprising a driving shaft, two auxiliary shafts operatively connected to said driving shaft, driving toothed members subdivided into two portions, one portion of each subdivided member being carried by one of said auxiliary shafts and the other portion by the second auxiliary shaft, toothed driven members adapted to coöperate with said driving toothed members and means adapted to effect at first a displacement of the portions of the subdivided driving members carried by one auxiliary shaft relatively to the latter and then of the portions of said subdivided driving members carried by the other auxiliary shaft relatively to the latter.

4. A change speed gear, comprising a driving shaft, two auxiliary shafts, means for transmitting the motion of said driving shaft to the auxiliary shafts, a sleeve keyed on each auxiliary shaft and adapted to slide in the longitudinal direction of the shaft, each of said sleeves having rims provided with teeth over one half of their circumference, a fourth shaft, toothed wheels fixed on the latter, each of said toothed wheels being adapted to coöperate with two toothed portions of sleeve-rims having the same diameter, and means for displacing successively the two sleeves in the longitudinal direction of the auxiliary shafts.

5. A change speed gear, comprising a driving shaft, two auxiliary shafts, means for transmitting the motion of said driving shaft to the auxiliary shafts, a sleeve keyed on each auxiliary shaft and adapted to slide in the longitudinal direction of the shaft, each sleeve having rims provided with teeth over one half of their circumference, a fourth shaft, toothed wheels fixed on the latter, each of said toothed wheels being adapted to coöperate with two toothed portions of rims having the same diameter and provided on different sleeves, a second sleeve on each auxiliary shaft provided with cams, adjustable pins adapted to coöperate with the cams of said sleeves, bearings for said pins, and means operatively connecting said bearings to the sleeves provided with rims in such a manner, that the latter are successively displaced in the longitudinal direction of the auxiliary shafts when one of said pins is brought to coöperate with one of said sleeves provided with a cam.

6. A change speed gear, comprising a driving shaft, two auxiliary shafts, means for transmitting the motion of said driving shaft to the auxiliary shafts, a sleeve keyed on each auxiliary shaft and adapted to slide in the longitudinal direction of the shaft, each sleeve having rims provided with teeth over one half of their circumference, a fourth shaft, toothed wheels fixed on the latter, each of said toothed wheels being adapted to coöperate with two toothed portions of rims having the same diameter and provided on different sleeves, a second sleeve on each auxiliary shaft provided with cams, a casing inclosing said auxiliary shafts and the fourth shaft, movable slides guided in said casing, pins adjustably mounted in said slides and adapted to coöperate with the cams of said sleeves, and means operatively connecting said slides to the sleeves provided with rims in such a manner, that the last mentioned sleeves are successively displaced in the longitudinal direction of the auxiliary shafts when one of said pins is brought to coöperate with one of said sleeves provided with a cam.

7. A change speed gear, comprising a driving shaft, two auxiliary shafts, means for transmitting the motion of said driving shaft to the auxiliary shafts, a sleeve keyed on each auxiliary shaft and adapted to slide in the longitudinal direction of the shaft, each sleeve having rims provided with teeth over one half of their circumference, a fourth shaft, toothed wheels fixed on the latter, each of said toothed wheels being adapted to coöperate with two toothed portions of rims having the same diameter and provided on different sleeves, a second sleeve on each auxiliary shaft provided with cams, a casing inclosing said auxiliary shafts and the fourth shaft, movable slides guided in said casing, pins adjustably mounted in said slides and adapted to coöperate with the cams of said sleeves, a second group of movable slides also guided in said casing, a fork-shaped member on each of the last mentioned slides coöperating with the sleeves adapted to slide in the longitudinal direction of the auxiliary shafts, and an intermediate member between each pair of movable slides appertaining to different slide-groups, said intermediate member effecting according to its position a displacement or no displacement of one of said slides carrying the fork-shaped member upon a coöperation of one of said pins with a cam of one of said sleeves mounted on the auxiliary shafts.

In testimony that I claim the foregoing as my invention I have signed my name.

JOHANN KLAUS OTT.